United States Patent [19]
Hinrichs

[11] 3,965,246
[45] June 22, 1976

[54] PROCESS FOR THE PRODUCTION OF AMMONIA USING ALIGNED CATALYST PARTICLES

[75] Inventor: Helmut Hinrichs, Leonding near Linz, Austria

[73] Assignee: Chemie Linz Aktiengesellschaft, Austria

[22] Filed: Feb. 19, 1974

[21] Appl. No.: 443,523

[30] Foreign Application Priority Data
Feb. 19, 1973 Germany............................ 2308101

[52] U.S. Cl............................... 423/361; 23/288 R; 252/477 R; 423/362
[51] Int. Cl.²........................................... C01C 1/04
[58] Field of Search............ 423/361, 362; 23/288 R, 23/252 R; 209/215; 214/1 R, 17 A, 17 C, 152; 252/477 R

[56] References Cited
UNITED STATES PATENTS

| 2,699,989 | 1/1955 | Houdry | 23/288 R |
| 3,059,420 | 10/1962 | Schnabel | 423/212 C |
| 3,243,386 | 3/1966 | Nielsen et al. | 423/362 |
| 3,305,312 | 2/1967 | Weinstein et al. | 423/362 |
| 3,499,797 | 3/1970 | Hooper | 23/288 R |
| 3,505,030 | 4/1970 | Sowards | 23/288 R |
| 3,507,627 | 4/1970 | Frant et al. | 252/477 R |
| 3,713,782 | 1/1973 | Watt | 23/288 R |
| 3,839,229 | 10/1974 | Senes et al. | 423/362 |

Primary Examiner—Oscar R. Vertiz
Assistant Examiner—Eugene T. Wheelock
Attorney, Agent, or Firm—Wenderoth, Lind & Ponack

[57] ABSTRACT

A process for carrying out a catalytic high pressure synthesis using gaseous reactants in the presence of a fused iron oxide catalyst, which comprises passing the gas through one or more layers of a catalyst which consists predominantly or entirely of particles of which the length of one spatial dimension is several times the length of at least one of the two other spatial dimensions perpendicular thereto, and at least one of the smaller spatial dimensions is less than 5 mm long, the catalyst being so arranged in one or more cylindrical catalyst beds, arranged in series in the direction of flow of the gas, that the particles are orientated with their longest spatial dimension substantially parallel to the direction of flow of the gas and a catalyst bed for carrying out the process.

6 Claims, 1 Drawing Figure

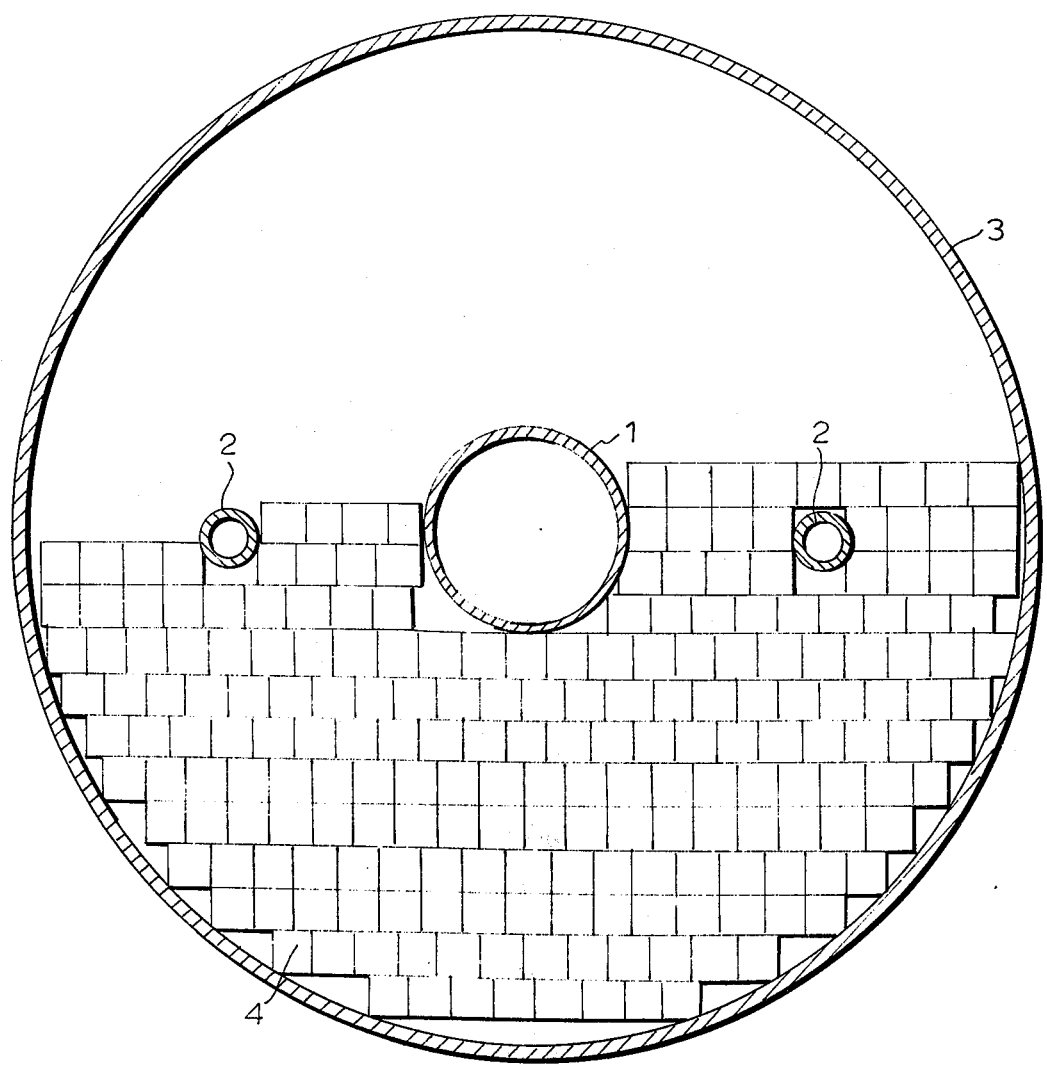

PROCESS FOR THE PRODUCTION OF AMMONIA USING ALIGNED CATALYST PARTICLES

This invention relates to a process for carrying out a catalytic synthesis using gaseous reactants, a catalyst bed therefor and a process for the preparation of the catalyst bed.

It is known that in catalytic high pressure synthesis of ammonia from nitrogen and hydrogen with the aid of a fused iron oxide catalyst, which is reduced to iron just before using, the activity of the catalyst increases with decreasing particle size. However, the utilisation of this inherently desirable higher activity is hindered by the increasing resistance to the flow of gas from layers of finely divided granular catalyst material, for example, of particle size 2 to 4 mm, since this increases the pressure loss in the furnace to unacceptable values.

In customary synthesis reactors in which the gas flows in an axial direction, the catalyst used is therefore restricted to a minimum particle size of about 5 mm.

Austrian Pat. Nos. 281,870 and 298,517 disclose processes for reducing the pressure loss within the furnace by changing the gas flow from an axial direction to a radial or spiral direction, so that it also becomes possible to use a catalyst having a particle size of 2 to 2.5 mm. The radial gas flow however requires additional inserts for redirecting the gas in a radial direction, which in turn implies a loss of catalyst space, whilst if the gas flow is spiral the pressure loss of the gas is not reduced as much as if the gas flow is radial, and in addition it has hitherto only been possible to solve the problem of cooling between the catalyst layers when using a cold gas feed.

It has now been found, surprisingly, that, to achieve an increased activity, it is not necessary for the catalyst to comprise particles having a small dimension in every direction and that instead it suffices if one spatial dimension of the catalyst particle is kept as small as corresponds to the optimum particle size whilst the other spatial dimensions, perpendicular thereto, optionally may be greater. This means that a spiculeshaped, i.e. needle-shaped, catalyst particle of width or thickness spicule-shaped, than 5 mm, for example 1 to 2 mm, but of a length which is several times the width or thickness displays as high an activity, or even a higher activity, than a spherical catalyst particle of approximately the same volume. The same is also true of catalyst particles of prismatic, truncated pyramid or truncated cone shape and even for particles which are disc-shaped or plate-shaped, in which only one spatial dimension, namely the thickness (of the plate) or height (of the disc) possesses the requisite length of less than 5 mm. Catalyst particles of these shapes have the advantage over spherical contact catalysts that when orientated in such a way that their direction of maximum spatial dimension, that is to say their longitudinal axis or height in the case of spicules, cylinders or prisms, or their diameter or edge length in the case of discs of plates, lies substantially parallel to the direction of gas flow, they offer relatively low resistance to the gas flow, so that they combine increased activity with the advantage of a reduced pressure loss, very much in contrast to spherical catalyst particles of small particle size. Thus, for example, the pressure loss in a furnace which is filled with spicules of 5 to 10 mm. length and 1 to 2 mm thickness in an orientated manner corresponds to that of a furnace which is filled with a catalyst in the form of spherical particles of particle size 8 to 9 mm, which catalyst has a substantially lower activity. This circumstance represents an important advance since hitherto, as a rule, a higher pressure loss had to be tolerated in return for increased activity, and vice versa.

Accordingly, the present invention provides in a process for carrying out the catalytic high pressure synthesis of ammonia using the gaseous reactants hydrogen and nitrogen in the presence of a fused iron oxide catalyst which is reduced to iron at the beginning of the synthesis of ammonia the improvement which comprises passing the gas through layers of said iron catalyst which consists predominantely, or entirely of particles of which the length of one spatial dimension is 2 to 20 times the length of at least one of the smaller spatial dimensions perpendicular thereto, and at least one of the smaller spatial dimensions is from 1 to 5 mm long, the catalyst being arranged in at least one cylindrical catalyst bed in a manner that the particles are orientated with their longest spatial dimension substantially parallel to the direction of flow of the gas.

The most favourable conditions are achieved if the catalyst used consists entirely of particles having the unequal spatial dimensions according to the invention, but a considerable advantage is also to be observed if a predominant portion of the catalyst, preferably more than 65 % by weight of the particles, conforms to the characteristics of the present invention. Forms of the catalyst particles in which the spatial dimension in one direction, measured as a length, is 2 to 20 times as great as at least one of the spatial dimensions perpendicular thereto are particularly preferred. This means, for example, that in the case of particles with a pronounced longitudinal axis the length or height is 2 to 20 times the width and/or thickness of the particle or, in the case of discs of circular or elliptical outline the diameter or the longer diameter is 2 to 20 times the thickness of the disc.

Particles of the shape required according to the invention, which are 1 to 2 mm wide or thick at one point, are particularly preferred. The preferred height is than 5 to 15 mm, more preferably 5 to 10 mm.

The orientation of the catalyst particles within the catalyst bed may be effected in any desired manner suitable for bringing about the requisite order in the arrangement. It has proved particularly advantageous and timesaving to apply a magnetic field to the bed, whereupon the particles orientate themselves with their greater dimension in the direction of the lines of force of the magnetic field which may be, in particular, an electrically produced magnetic field. The orientation must in that case be effected outside the reactor since it is not possible to exert the action of the magnetic field in a container consisting predominantly of iron. It is advisable to vibrate the material whilst applying the magnetic field in order to facilitate the orientation.

Of course, it is necessary to ensure that, on introducing the catalyst into the reactor the order, once achieved, is not destroyed again.

The catalyst may be most advantageously introduced into the reactor if the catalyst particles are first filled into a container with walls of non-magnetisable material, for example of plastic, brass or duralium, the shape of which fits the shape of the reactor chamber into which the catalyst is to be introduced. The base of this container must be detachable in a simple manner and must be produced of a material which can be gasified, for example wood. After applying the magnetic field, and after the orientation has been brought about, the container is lowered into the reactor and after detaching the base the tubular part of the container is carefully drawn out. The base remains in the reactor, where it is gasified during start-up.

If it is intended to fill a reactor which consists of one or more filled chamber compartments it is advisable to orientate the catalyst in several containers which together approximately or completely give the shape of the filled chamber and, after inserting the containers and detaching the bases, simultaneously or successively to remove the container walls. In these cases it is possible either to insert the containers until the chamber has been completely filled and only then to remove the walls, or initially only to fill a part of the chamber, for example half, with containers and to remove the walls of the containers first introduced and employ these, after fitting new bases, for the further filling of the furnace. The cross-section of the tubular reactor, partly filled by means of the non-magnetisable containers, with, for instance, a square basal plane having a side length of, say, 50 to 150 mm the diameter of the catalyst bed being for instance between 1,5 to 2 m, is shown in the drawing.

In the drawing, numeral 3 depicts the outer wall of the reactor; numeral 1 depicts the central tube of the reactor. The non-magnetisable containers are depicted by numeral 4 and tubes for thermocouples are depicted by numeral 2.

The comminution of the fused iron oxide catalyst may be effected in any customary manner, for example on a roll mill, and the proportion of longish or plate-shaped particles in the catalyst may be increased by sieving or grading.

The following Example illustrates the invention:

EXAMPLE

A crushed iron oxide fused contact catalyst consisting of spicules of 5 to 10 mm length and 1 to 2 mm width or thickness was filled in a random manner into an aluminium container of 30 ccs capacity provided with a detachable base. The catalyst was orientated in the direction of the longitudinal axis of the container by applying a magnetic field of strength 200 Gauss by means of a coil drawn over the container wall and fed with current, whilst simultaneously applying vibration. After introducing the container into an experimental furnace of corresponding capacity, the base was detached and the aluminium wall was drawn out.

The furnace thus filled in an orientated manner was fed at 300 atmospheres and a temperature of 480°C with a synthesis gas which contained hydrogen and nitrogen in a stoichiometric ratio for the synthesis of ammonia and which contained 11.0 % by volume of inert gases and 2.1 % by volume of ammonia, the amount of gas being 1,000 liters/hour. The percentage of ammonia in the gas after leaving the furnace was 15.7 % by volume. The pressure loss of the catalyst-filled tube was 40 mm. water column.

If the same furnace is filled with irregularly shaped granules of the same contact catalyst, of particle size 5.0 to 6.2 mm, and the ammonia synthesis is carried out under otherwise identical conditions, the gas contained 15.0 % by volume of ammonia after leaving the furnace. The pressure loss in the furnace was 84 mm water column.

What we claim is:

1. In a process for carrying out the catalytic high pressure synthesis of ammonia using the gaseous reactants hydrogen and nitrogen in the presence of a fused iron oxide catalyst which is reduced to iron at the beginning of the synthesis of ammonia the improvement which comprises passing the gas through layers of said iron catalyst which consists predominately or entirely of particles of which the length of one spatial dimension is 2 to 20 times the length of at least one of the smaller spatial dimensions perpendicular thereto, and at least one of the smaller spatial dimensions is from 1 to 5 mm long, the catalyst being arranged in at least one cylindrical catalyst bed in a manner that the particles are orientated with their longest spatial dimension substantially parallel to the direction of flow of the gas.

2. A process according to claim 1, which comprises arranging the catalyst in several cylindrical beds.

3. A process according to claim 1, in which the amount of particles of the iron catalyst with a greater spatial dimension in one direction is at least 65 % relative to the total catalyst weight.

4. A process according to claim 1, in which at least one of the spatial dimensions perpendicular to the longest spatial dimension of the particles of the iron catalyst is 1 to 2 mm long.

5. A process according to claim 1, in which the particles of the catalyst are substantially spiculelike, prismatic, truncated pyramid, truncated cone, disc-like or plate-like shape.

6. A process according to claim 1, in which the particles of the iron catalyst are of fused iron oxide, which have been orientated by the application of a magnetic field and filled into a tubular reactor, which iron oxide is reduced to iron at the beginning of the synthesis.

* * * * *